Dec. 2, 1924.
G. BESSIÈRE
1,517,338
MEANS FOR PROPELLING BICYCLES AND SMALL VEHICLES
Filed April 18, 1922  2 Sheets—Sheet 1
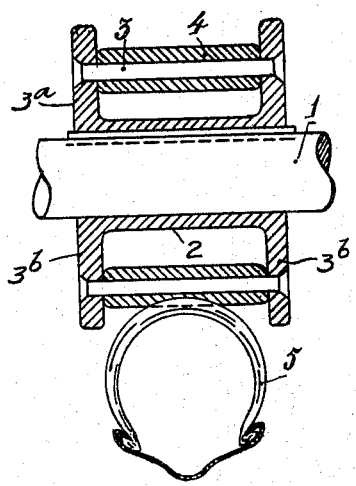
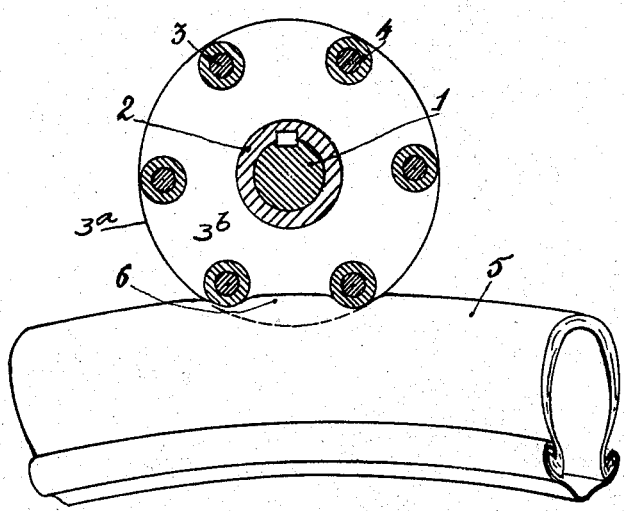
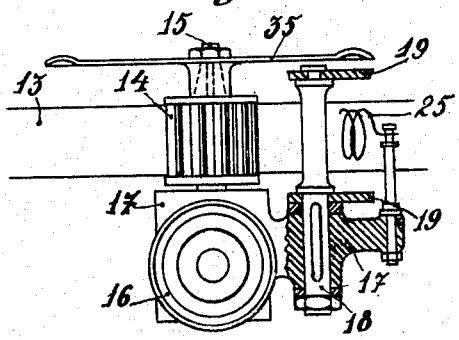

Dec. 2, 1924.
G. BESSIÈRE
1,517,338
MEANS FOR PROPELLING BICYCLES AND SMALL VEHICLES
Filed April 18, 1922     2 Sheets—Sheet 2

Inventor-
Gustave Bessière,
By B. Singer, Atty.

Patented Dec. 2, 1924.

1,517,338

UNITED STATES PATENT OFFICE.

GUSTAVE BESSIÈRE, OF NEUILLY-SUR-SEINE, FRANCE.

MEANS FOR PROPELLING BICYCLES AND SMALL VEHICLES.

Application filed April 18, 1922. Serial No. 555,100.

*To all whom it may concern:*

Be it known that I, GUSTAVE BESSIÈRE, a citizen of the Republic of France, residing at Neuilly-sur-Seine, France, have invented new and useful Improvements in Means for Propelling Bicycles and Small Vehicles, of which the following is a specification.

This invention relates to a method of mechanical propulsion for bicycles and other small vehicles as well as the means for effecting it, in its various applications.

The invention consists in the engagement of a wheel of the vehicle or bicycle by a reel carrying rollers between the end discs. The reel carrying the rollers engaging the tire of the wheel is driven by an engine suitably arranged with respect to the wheel; the reel may be mounted directly on the engine shaft or driven through suitable gearing.

This arrangement ensures the engagement of the wheel under advantageous conditions, more particularly with regard to the speed control without any sensible loss of power due to relative sliding or friction.

A spring or other suitable arrangement is provided for ensuring the working of the device when driven by the engine which spring keeps the driving rollers against the tire, the pressure being adjustable.

Moreover the aforesaid means include a suitable vibration absorber, which absorbs any vibrations of the engine, the engine being pivoted.

The reel carrying the rollers is so arranged as will be hereinafter described to allow of gear changing. Moreover the engagement of the reel is controlled by hand which allows the position of the pivoted engine and therefore of the reel to be varied, with relation to the tire.

The accompanying drawings given by way of example show one form of the invention.

Figs. 1 and 2 are vertical and longitudinal sections respectively of the roller drive.

Fig. 4 is a detail plan of the same partly in section.

Figures 3, 5:
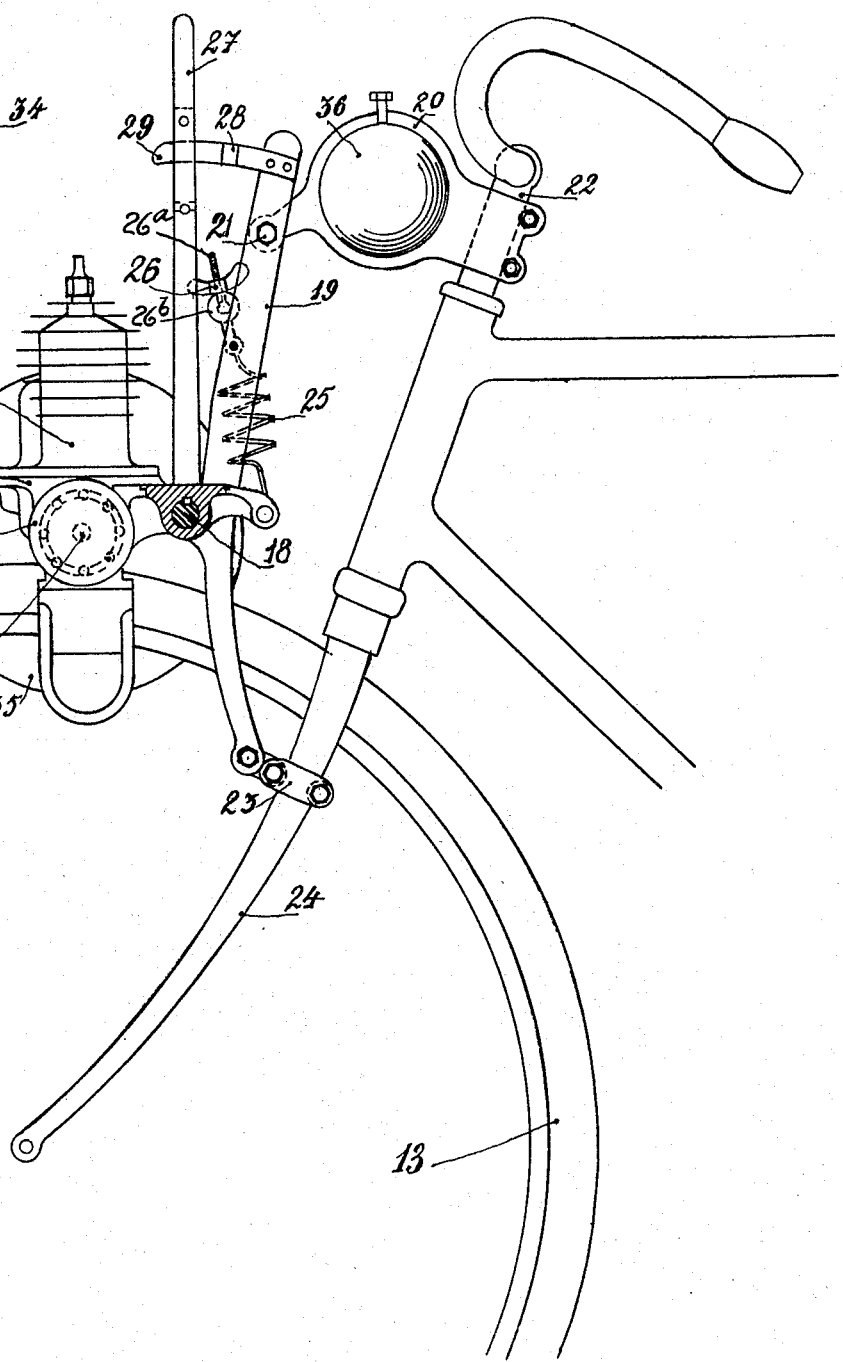
Fig. 3 is a side elevation of bicycle fitted with driving arrangement shown in Figs. 1 and 2.
Fig. 5 is a detail view of the control arrangement shown in Fig. 3.

The reel 3ª is formed with a hub 2, mounted on the main shaft 1 of the engine. The end discs 3ᵇ of the reel carry the transverse spindles 3 on which the rollers 4 are loosely mounted.

The rollers 4 coming in contact with the tire ensure the drive, the rollers being held tightly against the tire, by a spring suitably placed or by any other similar arrangement. The rollers 4 are pressed into the tire which will take up between two consecutive rollers a shape 6 (Fig. 2), due to the pressure of the spring.

Each roller traces out an epicycloid with respect to the tire, and moreover during the engagement of the roller no rubbing of the rubber takes place since the roller is free to rotate on its spindle. A drive without sliding or friction is thus obtained.

Figures 3, 4 and 5 show the invention applied to a bicycle thus transforming it into a motor cycle. The spring arrangements for keeping the rollers against the tire will now be described.

The roller reel 14, of the general type shown in Fig. 1 is keyed to the engine shaft 15 and applied to the tire 13.

The engine comprising cylinder 16 and crank case 17, is carried by a shaft 18 pivoted on two arms 19. The ends of these arms 19 are affixed to the front forks, and the upright of the handle bars. An adjustable bracket 20, attached by bolts 21 to the arm 19, affixes the arm 19 to the upright 22 of the handle bars. A clamp 23 affixes the other end of the arm 19 to the front forks.

The correct pressure of the drum on the tire is attained by means of the spring 25 which is adjusted by a wing nut 26. Said nut engages a screw rod 26ª which is slidably mounted in a bearing 26ᵇ, one end of said rod being extended to one end of the spring. On the shaft 18 keyed to the engine is also keyed a lever 27 which pivots with the engine and which serves the double purpose of allowing the reel to be lifted from the tire if the bicycle is to be wheeled backwards and of damping any vibrations.

A stop 28 keeps the engine clear of the wheel when not in use.

Mounted on the lever 27 which moves over a quadrant 29 is an arm 30 pivoted at 31 which bears on the opposite side of the quadrant 29. The contact portion of this arm 30 is covered with fibre 32 or other suitable material to produce a frictional contact with the quadrant 29. Contact is also maintained by a spring 33 adjusted by a nut 34.

The bracket 20 may also be used to carry the petrol tank 36. The fly wheel 35 may be mounted on the end of the shaft 15 in such a way as to be readily detached for removing the reel 14.

I claim:

1. Propulsion means for bicycles comprising a pair of arms, means to pivotally connect said arms to the front fork of a bicycle a supporting base pivotally mounted on said arms and having a lever said lever and said arms having means to secure said lever and therefore said base to adjusted position, an engine mounted on said base, a reel driven by said engine and comprising a pair of disks, cylinders connecting said disks and rollers arranged for rotation on said cylinders and for direct engagement with a pneumatic tire of said bicycle and a spring active on said base to press said reel against said tire to cause the rollers of the reel, as the latter revolves, to successively press against engage in and deform the tire.

2. Propulsion means for bicycles comprising a pair of arms, means to pivotally connect said arms to the front fork of a bicycle a supporting base pivotally mounted on said arms and having a lever said lever and said arms having means to secure said lever and therefore said base to adjusted position, an engine mounted on said base, a reel driven by said engine and having rollers arranged for rotation and also for direct engagement with a pneumatic tire of said bicycle and a spring active on said base to press said reel against said tire to cause the rollers of the reel as the latter revolves, to successively press against engage in and deform the tire, and means to vary the tension of said spring.

In witness whereof I affix my signature.

GUSTAVE BESSIÈRE.